(12) United States Patent
Zhuang et al.

(10) Patent No.: US 10,951,425 B2
(45) Date of Patent: Mar. 16, 2021

(54) POWER SUPPLY METHOD, DEVICE, AND POWER SUPPLY SYSTEM

(71) Applicant: Huawei Technologies Co., Ltd., Shenzhen (CN)

(72) Inventors: Yan Zhuang, Nanjing (CN); Shiyong Fu, Nanjing (CN); Jincan Cao, Nanjing (CN); Fuguang Huang, Nanjing (CN); Xueqi Chen, Nanjing (CN); Rui Hua, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 16/371,918

(22) Filed: Apr. 1, 2019

(65) Prior Publication Data

US 2019/0229934 A1 Jul. 25, 2019

Related U.S. Application Data (63) Continuation of application No. PCT/CN2017/088181, filed on Jun. 14, 2017.

(30) Foreign Application Priority Data

Sep. 30, 2016 (CN) .......................... 201610877306.4

(51) Int. Cl.
*G06F 1/26* (2006.01)
*H04L 12/10* (2006.01)
*H04L 12/40* (2006.01)

(52) U.S. Cl.
CPC .............. *H04L 12/10* (2013.01); *G06F 1/266* (2013.01); *H04L 12/40032* (2013.01); *H04L 12/40045* (2013.01)

(58) Field of Classification Search
None
See application file for complete search history.

(56) References Cited

U.S. PATENT DOCUMENTS 7,478,251 B1 * 1/2009 Diab ...................... G06F 1/189
713/300
2007/0288771 A1 12/2007 Robbins
(Continued)

FOREIGN PATENT DOCUMENTS

| CN | 102387022 A | 3/2012 |
| CN | 102664741 A | 9/2012 |

(Continued)

OTHER PUBLICATIONS

Machine Translation and Abstract of Chinese Publication No. CN102664741, Sep. 12, 2012, 11 pages.
(Continued)

*Primary Examiner* — Fahmida Rahman
(74) *Attorney, Agent, or Firm* — Conley Rose, P.C.

(57) ABSTRACT

A power over Ethernet method includes: performing, by power sourcing equipment, a plurality of detections by using an Ethernet port, connected to an intermediate device, of the power sourcing equipment, where a quantity of detections performed by the power sourcing equipment is equal to a quantity of power supply ports of the intermediate device; and if at least one detection result of the plurality of detections is effective, sending, by the power sourcing equipment, a power supply indication to the intermediate device, and supplying power to the connection port. In this way, the power sourcing equipment can supply power across the intermediate device to a powered device connected to the intermediate device, and a power loss caused by voltage conversion is avoided.

20 Claims, 5 Drawing Sheets

---

Power sourcing equipment 10 performs a plurality of detections by using a connection port, where the connection port is an Ethernet port, connected to an intermediate device, of the power sourcing equipment 10 — 601

When at least one detection result of the plurality of detections is effective, the power sourcing equipment 10 sends a power supply indication to the intermediate device, and supplies power to the connection port — 602

(56) References Cited

U.S. PATENT DOCUMENTS

| | | | |
|---|---|---|---|
| 2013/0103958 A1 | 4/2013 | Hua et al. | |
| 2013/0234668 A1* | 9/2013 | Kuo | G06F 1/266 320/125 |
| 2013/0339760 A1* | 12/2013 | Zimmerman | G06F 1/26 713/300 |
| 2014/0129855 A1 | 5/2014 | Hamdi et al. | |
| 2015/0127957 A1* | 5/2015 | Sethi | G06F 1/26 713/300 |
| 2015/0277522 A1 | 10/2015 | Kao | |
| 2016/0191256 A1* | 6/2016 | Wendt | G06F 1/266 713/300 |
| 2019/0327099 A1* | 10/2019 | Vanich | H04L 12/10 |

FOREIGN PATENT DOCUMENTS

| | | | | |
|---|---|---|---|---|
| CN | 102710425 A | | 10/2012 | |
| CN | 102761422 A | | 10/2012 | |
| CN | 102970148 A | | 3/2013 | |
| CN | 204498138 U | | 7/2015 | |
| CN | 105049216 A | | 11/2015 | |
| CN | 107888387 | * | 4/2020 | ............ H04L 12/10 |
| EP | 3512160 A1 | * | 7/2019 | ....... H04L 12/40032 |
| WO | 2016020122 A1 | | 2/2016 | |
| WO | 2018214590 A1 | | 11/2018 | |

OTHER PUBLICATIONS

Machine Translation and Abstract of Chinese Publication No. CN102710425, Oct. 3, 2012, 28 pages.

Machine Translation and Abstract of Chinese Publication No. CN102761422, Oct. 31, 2012, 10 pages.

Machine Translation and Abstract of Chinese Publication No. CN102970148, Mar. 13, 2013, 16 pages.

Machine Translation and Abstract of Chinese Publication No. CN105049216, Nov. 11, 2015, 13 pages.

Machine Translation and Abstract of Chinese Publication No. CN204498138, Jul. 22, 2015, 7 pages.

Machine Translation and Abstract of International Publication No. WO2018214590, Nov. 29, 2018, 52 pages.

Dingding et al., "The Study on Power Over Ethernet (POE) Technology," Process Automation Instrumentation, vol. 26, No. 1, Jan. 2005, 5 pages.

"IEEE802.3at Power over Ethernet Plus (PoE+), Answering challenges to structured cabling in buildings," White Paper, Nexans Cabling Solutions, Jan. 2013, 10 pages.

"Part 3: Carrier Sense Multiple Access with Collision Detection (CSMA/CD) Access Method and Physical Layer Specifications"—Amendment 3: Data Terminal Equipment (DTE) Power via the Media Dependent Interface (MDI) Enhancements, IEEE Std 802.3at, Oct. 30, 2009, 141 pages.

Foreign Communication From a Counterpart Application, Chinese Application No. 201610877306.4, Chinese Office Action dated Apr. 10, 2019, 6 pages.

Foreign Communication From a Counterpart Application, European Application No. 17854462.3, Extended European Search Report dated Jun. 27, 2019, 6 pages.

Foreign Communication From a Counterpart Application, PCT Application No. PCT/CN2017/088181, English Translation of International Search Report dated Aug. 29, 2017, 3 pages.

Foreign Communication From a Counterpart Application, PCT Application No. PCT/CN2017/088181, English Translation of Written Opinion dated Aug. 29, 2017, 4 pages.

* cited by examiner

POWER SUPPLY METHOD, DEVICE, AND POWER SUPPLY SYSTEM

CROSS-REFERENCE TO RELATED APPLICATIONS

This application is a continuation application of international patent application number PCT/CN2017/088181 filed on Jun. 14, 2017, which claims priority to Chinese patent application number 201610877306.4 filed on Sep. 30, 2016, which are incorporated by reference.

TECHNICAL FIELD

The present disclosure relates to the communications field, and in particular, to a power supply method, a device, and a power supply system.

BACKGROUND

A mobile terminal such as a smartphone or a portable computer may access the Internet by using a wireless local area network (WLAN). In some scenarios (such as a student dormitory, a hospital ward, and a hotel), if an access point (AP) is merely deployed in a public area, indoor signal quality is poor. However, if more APs are deployed, device management complexity is increased.

A distributed WLAN includes a central AP and a distributed AP. One central AP is connected to a plurality of distributed APs. The distributed WLAN can provide wider network coverage and simplify device management and configuration.

Figure 1:
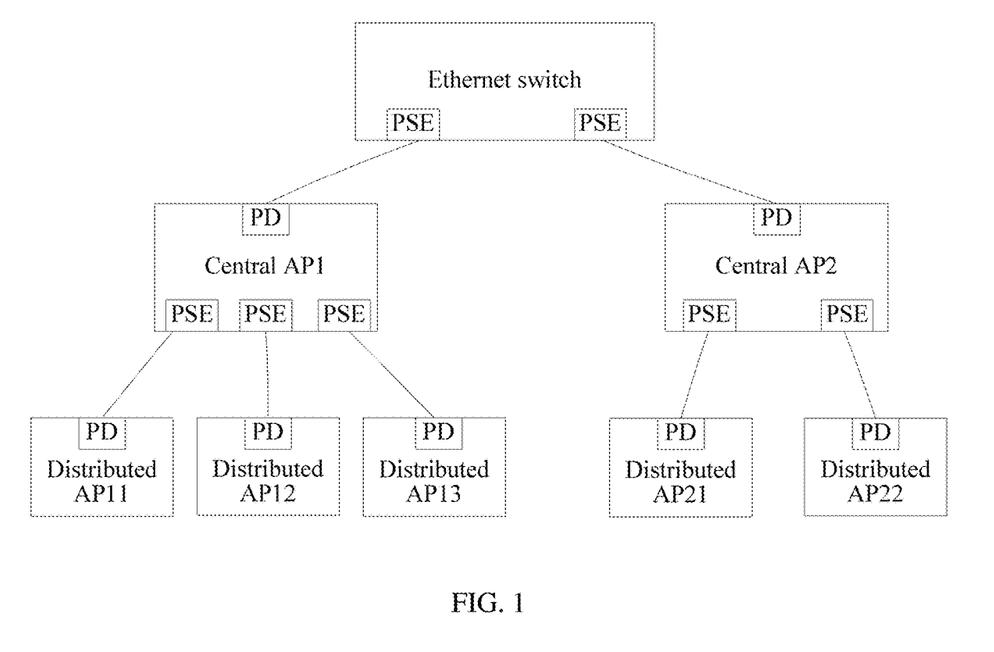
FIG. 1 is a schematic diagram of power over Ethernet in a distributed WLAN.

In a distributed WLAN in which a power over Ethernet (PoE) technology is used, as shown in FIG. 1, an Ethernet switch is used as power sourcing equipment (PSE) to supply power to a central AP. The central AP is a powered device (PD) of the Ethernet switch, and obtains electricity from the Ethernet switch. The central AP is also used as PSE to supply power to each distributed AP connected to a power supply port of the central AP. The distributed AP is used as a PD of the central AP, and obtains electricity from the central AP. After obtaining electricity from the Ethernet switch, the central AP converts the electricity into electricity that meets a voltage used by the central AP, to supply power to each component of the central AP. Then, the central AP converts electricity used by the central AP into a voltage that meets a PoE requirement, and then supplies power to the distributed AP. Consequently, an additional electricity loss is caused.

SUMMARY

This application provides a power supply method, a device, and a power supply system. Power sourcing equipment supplies power across an intermediate device to a powered device. This can avoid a power loss caused by voltage conversion, improve power supply efficiency, and reduce device complexity.

According to a first aspect, power sourcing equipment is provided, including a processor, an Ethernet port, and a power supply circuit, where the processor is configured to: perform a plurality of detections by using the Ethernet port, where a quantity of performed detections is equal to a quantity of power supply ports of the intermediate device, and the Ethernet port is connected to the intermediate device; and when at least one detection result of the plurality of detections is effective, send a power supply indication to the intermediate device, and supply power to the Ethernet port, where the power supply indication is based on each detection result of the plurality of detections.

The power sourcing equipment may be an Ethernet device supporting PoE or power over data lines (PoDL).

The power sourcing equipment provided in this application performs the plurality of detections by using the Ethernet port connected to the intermediate device, to detect a plurality of powered devices connected to the intermediate device; and when determining that there is an effective powered device in the plurality of powered devices, supplies power to the Ethernet port, sends the power supply indication to the intermediate device, and supplies power to the effective powered device with cooperation of the intermediate device.

In a first possible implementation of the first aspect, the processor includes a central processing unit (CPU) and a PSE chip, the PSE chip is connected to the Ethernet port, and the power supply circuit is connected to the PSE chip; the PSE chip is configured to detect the Ethernet port, and the detecting the Ethernet port includes: inputting a detection voltage to the Ethernet port, detecting impedance of a currently connected power supply port of the intermediate device, and obtaining a detection result based on the detected impedance; when at least one detection result of the plurality of detections is effective, the PSE chip supplies power to the Ethernet port by using the power supply circuit.

The CPU includes a general purpose processor, a network processor (NP), an embedded processor, and the like.

With reference to the first aspect or the first possible implementation of the first aspect, in a second possible implementation of the first aspect, the processor is specifically the CPU and is configured to send a detection result of one detection to the intermediate device after this detection is completed. When the detection result is effective, the detection result may also be used as the power supply indication, to instruct the intermediate device to connect a currently detected power supply port, to supply power to the power supply port. In this way, the detection result of the currently connected power supply port can be notified to the intermediate device in real time.

With reference to the first aspect or the first possible implementation of the first aspect, in a third possible implementation of the first aspect, the processor is specifically the CPU and is configured to send the power supply indication to the intermediate device after the plurality of detections are completed. The power supply indication may include an identifier, a serial number, or a bitmap of a port to indicate a to-be-powered power supply port. The power supply indication is used to instruct the intermediate device to connect the to-be-powered power supply port. Before sending the power supply indication, the processor may record each detection result of the plurality of detections, and generate the power supply indication according to a power supply policy. In this way, the power sourcing equipment may determine to-be-powered power supply port with reference to the detection result and the power supply policy, to perform power supply control according to the policy.

With reference to any one of the first aspect or the first to the third possible implementations of the first aspect, in a fourth possible implementation of the first aspect, the processor is configured to: receive a detection indication sent by the intermediate device, and periodically detect the currently connected power supply port of the intermediate device based on the detection indication. A period of the detection is preset detection duration, and the preset detection duration may be preset or from the intermediate device. The detection indication may be an electrical signal, and is specifically the detection indication that is sent by the intermediate device and that is received by the PSE chip. Alternatively, the detection indication may be a data link layer packet, and is specifically the detection indication that is sent by the intermediate device and that is received by the CPU; and the detection indication may further include the preset detection duration.

With reference to any one of the first aspect or the first to the third possible implementations of the first aspect, in a fifth possible implementation of the first aspect, the processor is specifically configured to: send a detection indication to the intermediate device, where the detection indication is used to instruct the intermediate device to successively connect a plurality of power supply ports of the intermediate device based on preset detection duration; and periodically detect the currently connected power supply port of the intermediate device, where a period of the detection is the preset detection duration.

The detection indication may be an electrical signal, and is specifically the detection indication sent by the PSE chip to the intermediate device.

Alternatively, the detection indication may be a data link layer packet, and is specifically the detection indication sent by the CPU to the intermediate device; and the detection indication may further include the preset detection duration.

In the foregoing fourth or fifth possible implementation, the periodically detecting the currently connected power supply port of the intermediate device may be that the PSE chip periodically performs detections, or may be that the CPU periodically sends an IIC instruction to the PSE chip, and the PSE chip performs detections according to the IIC instruction.

In the foregoing fourth or fifth possible implementation, information exchange between the power sourcing equipment and the intermediate device can be reduced, and a detection process of the power sourcing equipment is simplified.

With reference to any one of the first aspect or the first to the third possible implementations of the first aspect, in a sixth possible implementation of the first aspect, the processor is configured to: between any two detections, receive a detection indication sent by the intermediate device, or send a detection indication to the intermediate device.

Specifically, before performing each detection, the processor sends a detection indication to the intermediate device, where the detection indication is used to instruct the intermediate device to connect a next to-be-detected power supply port. Alternatively, the processor receives a detection indication sent by the intermediate device, and performs a next detection based on the detection indication by using the connection port.

In this way, a delay caused because a constant detection period is used for each power supply port can be avoided, and detection efficiency is improved.

With reference to any one of the first aspect or the foregoing possible implementations, in a seventh possible implementation of the first aspect, the processor is further configured to: detect the intermediate device, and when the intermediate device is an effective powered device, supply power to the intermediate device.

According to a second aspect, a network device is provided, including a detection control switch, a power supply control switch, a power extraction port, and a plurality of power supply ports, where the detection control switch is connected to the power extraction port and the plurality of power supply ports, the power supply control switch is connected to the power extraction port and the plurality of power supply ports, and the power extraction port is connected to power sourcing equipment; the detection control switch is configured to connect the power extraction port with any one of the plurality of power supply ports, so that the power sourcing equipment detects the power supply port in the plurality of power supply ports that is connected by the detection control switch; and the power supply control switch is configured to connect the power extraction port with an effective port in the plurality of power supply ports after the detection, where the effective port is a power supply port whose detection result is effective.

The detection control switch includes a first switch and a first controller, and the first switch is a single-pole multi-throw switch. The power supply control switch includes a second switch and a second controller, and the second switch is a multi-pole single-throw switch.

The network device in this application cooperates with the power sourcing equipment to detect the plurality of power supply ports of the network device by using the detection control switch and the power supply control switch, and cooperates with the power sourcing equipment based on a power supply indication to control power supplied to a powered device. In this way, a PSE chip does not need to be disposed for each power supply port, and device complexity and costs can be reduced.

In a first possible implementation of the second aspect, the power supply control switch is configured to: receive a power supply indication sent by the power sourcing equipment, and connect the effective port based on the power supply indication.

With reference to the second aspect or the first possible implementation of the second aspect, in a second possible implementation of the second aspect, the detection control switch is configured to: receive a detection indication sent by the power sourcing equipment; and successively connect the plurality of power supply ports based on the detection indication, and keep each power supply port in a connected state for preset detection duration.

With reference to the second aspect or the first possible implementation of the second aspect, in a third possible implementation of the second aspect, the detection control switch is configured to: send a detection indication to the power sourcing equipment, where the detection indication is used to instruct the power sourcing equipment to periodically detect, based on preset detection duration, the power supply port currently connected by the detection control switch; and successively connect the plurality of power supply ports, and keep each power supply port in a connected state for preset detection duration.

With reference to the second aspect or the first possible implementation of the second aspect, in a fourth possible implementation of the second aspect, the detection control switch is configured to: receive a detection indication sent by the power sourcing equipment, and connect a next to-be-detected power supply port in the plurality of power supply ports based on the detection indication; or connect a next to-be-detected power supply port in the plurality of power supply ports, and send a detection indication to the power sourcing equipment, where the detection indication is used to instruct the power sourcing equipment to perform one detection.

According to a third aspect, a power supply method is provided, including: performing, by power sourcing equipment, a plurality of detections by using a connection port, where the connection port is an Ethernet port, connected to an intermediate device, of the power sourcing equipment, and a quantity of detections performed by the power sourcing equipment is equal to a quantity of power supply ports of the intermediate device; and if at least one detection result of the plurality of detections is effective, sending, by the power sourcing equipment, a power supply indication to the intermediate device, and supplying power to the connection port, where the power supply indication is based on each detection result of the plurality of detections.

According to the power supply method provided in this application, the power sourcing equipment performs the plurality of detections by using the Ethernet port connected to the intermediate device, to detect a plurality of powered devices connected to the intermediate device; and when determining that there is an effective powered device in the plurality of powered devices, supplies power to the Ethernet port, and sends the power supply indication to the intermediate device, to supply power the effective powered device by using the intermediate device.

In a first possible implementation of the third aspect, the sending, by the power sourcing equipment, a power supply indication to the intermediate device includes any one or more of the following: sending, by the power sourcing equipment, the power supply indication to the intermediate device after the plurality of detections are completed; and sending, by the power sourcing equipment, a detection result of one detection to the intermediate device after this detection is completed.

With reference to the third aspect or the first possible implementation of the third aspect, in a second possible implementation of the third aspect, the performing, by power sourcing equipment, a plurality of detections by using a connection port includes: sending, by the power sourcing equipment, a detection indication to the intermediate device before performing any detection; or performing, by the power sourcing equipment, one detection each time when receiving a one-time detection indication sent by the intermediate device.

In this way, the power sourcing equipment and the intermediate device perform each detection synchronously based on the detection indication, to complete detections of all power supply ports, so that detection flexibility can be improved.

With reference to the third aspect or the first possible implementation of the third aspect, in a third possible implementation of the third aspect, the performing, by power sourcing equipment, a plurality of detections by using a connection port includes: receiving, by the power sourcing equipment, a detection indication sent by the intermediate device; and periodically detecting, by the power sourcing equipment, a currently connected power supply port of the intermediate device based on the detection indication.

With reference to the third aspect or the first possible implementation of the third aspect, in a fourth possible implementation of the third aspect, the performing, by power sourcing equipment, a plurality of detections by using a connection port includes: sending, by the power sourcing equipment, a detection indication to the intermediate device, where the detection indication is used to instruct the intermediate device to successively connect a plurality of power supply ports of the intermediate device based on preset detection duration; and periodically detecting, by the power sourcing equipment, a currently connected power supply port of the intermediate device, where a period of the detection is the preset detection duration.

In the foregoing third or fourth possible implementation, a one-time detection indication is sent between the intermediate device and the power sourcing equipment to start a detection. The intermediate device successively switches the power supply ports based on the detection period. The power sourcing equipment periodically performs detections, and completes detections of all power supply ports. This can reduce information exchange between the power sourcing equipment and the intermediate device, and simplify a detection process of the power sourcing equipment.

With reference to any one of the third aspect or the foregoing possible implementations of the third aspect, in a fifth possible implementation of the third aspect, the method further includes: detecting, by the power sourcing equipment, whether the intermediate device is an effective powered device; and when determining that the intermediate device is the effective powered device, supplying, by the power sourcing equipment, power to the intermediate device.

According to a fourth aspect, power sourcing equipment is provided, including a function module configured to implement the power supply method in the third aspect.

According to a fifth aspect, a computer storage medium is provided, configured to store a computer program, where the computer program includes an instruction used to perform the method in the third aspect or any possible implementation of the third aspect.

According to a sixth aspect, a power supply system is provided, including the power sourcing equipment according to any one of the first aspect and the possible implementations of the first aspect, the network device according to any one of the second aspect and the possible implementations of the second aspect and a plurality of powered devices, where the plurality of powered devices are respectively connected to the plurality of power supply ports of the network device.

DESCRIPTION OF EMBODIMENTS

The following describes, with reference to the accompanying drawings and specific embodiments, technical solutions provided in this application.

Figure 2:
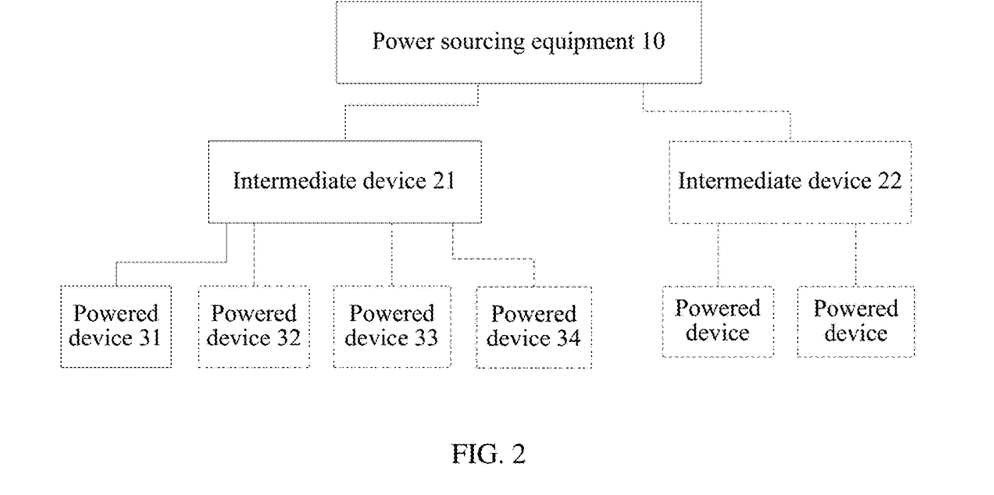
FIG. 2 is a schematic structural diagram of a power supply system according to an embodiment of the present disclosure.

Referring to FIG. 2, FIG. 2 is a schematic structural diagram of a power supply system according to an embodiment of the present disclosure. The system includes power sourcing equipment 10, an intermediate device 21, and a powered device 31. The powered device 31 is connected to the intermediate device 21, and the intermediate device 21 is connected to the power sourcing equipment 10.

Optionally, there are a plurality of intermediate devices connected to the power sourcing equipment 10. For example, as shown in FIG. 2, the system may further include an intermediate device 22, and the intermediate device 22 is connected to the power sourcing equipment 10.

Optionally, there are a plurality of powered devices connected to the intermediate device 21. For example, as shown in FIG. 2, the system may further include powered devices 32 to 34, and the powered devices 32 to 34 are separately connected to the intermediate device 21.

The power sourcing equipment in this embodiment of the present disclosure may be an Ethernet device supporting PoE or PoDL, such as a switch or a router. Usually, the power sourcing equipment includes a PSE chip. The PSE chip is a chip designed to have a PSE function meeting a PoE or PoDL protocol requirement, and usually can provide detection and classification functions.

The power sourcing equipment 10 is configured to perform power supply control on the powered devices connected to the intermediate device 21.

Specifically, the power sourcing equipment 10 performs a plurality of detections by using a connection port connected to the intermediate device 21. When at least one detection result of the plurality of detections is effective, the power sourcing equipment 10 sends a power supply indication to the intermediate device 21, and supplies power to the connection port.

The connection port is an Ethernet port. A quantity of detections performed by the power sourcing equipment 10 is equal to a quantity of power supply ports of the intermediate device 21. The power supply indication is based on each detection result of the plurality of detections.

Optionally, the intermediate device may also be a powered device. The power sourcing equipment 10 may be further configured to supply power to the intermediate device. Specifically, the intermediate device 21 is used as an example. The power sourcing equipment 10 detects whether the intermediate device 21 is an effective powered device, and when determining that the intermediate device 21 is the effective powered device, supplies power to the intermediate device 21.

In the power supply system provided in this embodiment of the present disclosure, by using the intermediate device, the power sourcing equipment may detect the powered devices connected to the intermediate device, and supply power to an effective powered device. This not only can avoid a power loss caused by voltage conversion and improve power supply efficiency, but also can reduce device complexity, thereby reducing device costs.

As an example, in a power supply system shown in FIG. 2, power sourcing equipment 10 performs, across an intermediate device 21, power supply control on each powered device connected to the intermediate device 21. The following describes a structure of the power sourcing equipment 10 and the intermediate device 21 and a connection relationship between the power sourcing equipment 10, the intermediate device 21, and a powered device by using the example.

Figure 3:
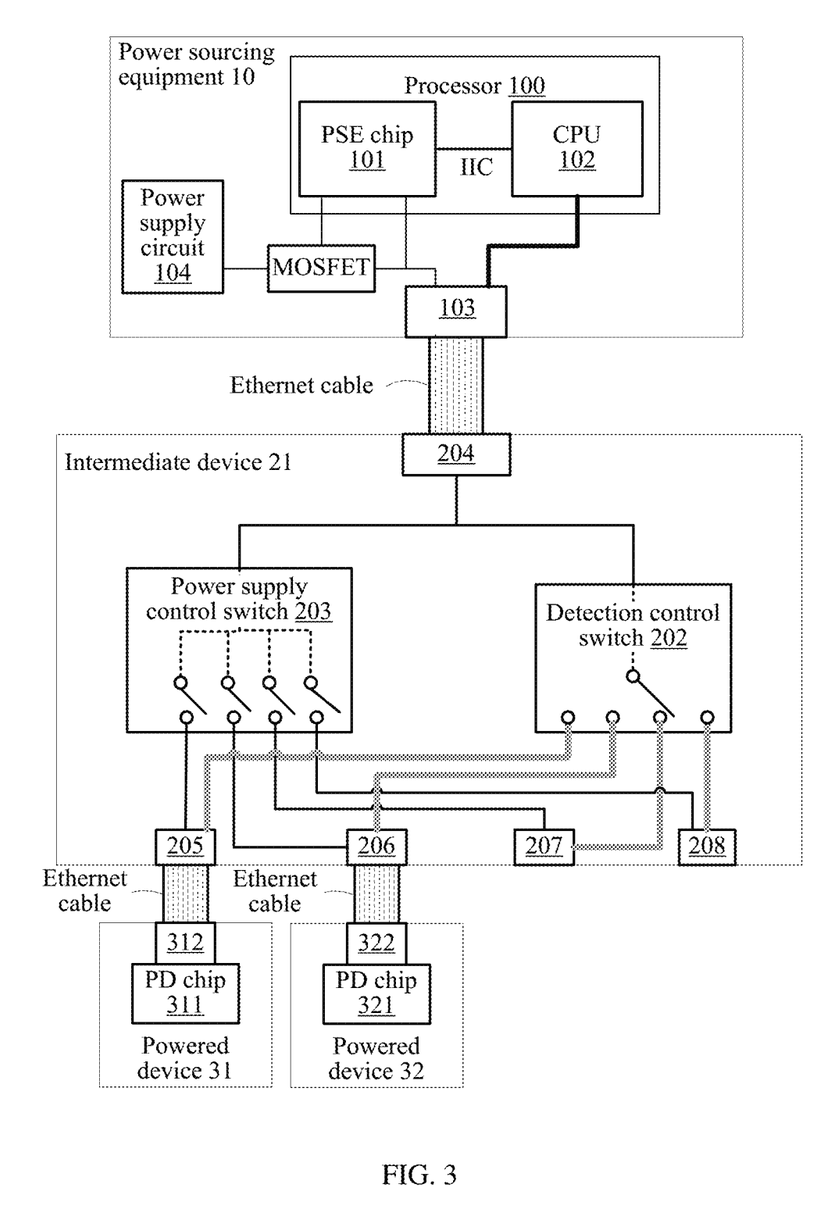
FIG. 3 is a schematic diagram of a device structure and a connection relationship in a power supply system according to an embodiment of the present disclosure.

FIG. 3 is a schematic diagram of a device structure and a connection relationship in a power supply system according to an embodiment of the present disclosure. As shown in FIG. 3, power sourcing equipment 10 includes a processor 100, an Ethernet port 103, and a power supply circuit 104. The processor 100 includes a PSE chip 101 and a CPU 102.

An intermediate device 21 includes a detection control switch 202, a power supply control switch 203, a power extraction port 204, and power supply ports 205 to 208. The power extraction port 204 and the power supply ports 205 to 208 are Ethernet ports.

A powered device 31 includes a PD chip 311 and a power extraction port 312, and the PD chip 311 is connected to the power extraction port 312. A powered device 32 includes a PD chip 321 and a power extraction port 322, and the PD chip 321 is connected to the power extraction port 322.

The power extraction port 312 of the powered device 31 is connected to the power supply port 205 of the intermediate device 21 by using an Ethernet cable. The power extraction port 322 of the powered device 32 is connected to the power supply port 206 of the intermediate device 21 by using an Ethernet cable.

The power extraction port 204 of the intermediate device 21 is connected to the Ethernet port 103 of the power sourcing equipment 10 by using an Ethernet cable. The power sourcing equipment 10 may further include one or more other Ethernet ports.

The CPU 102 is connected to the PSE chip 101 by using an inter-integrated circuit (IIC) bus.

In this embodiment of the present disclosure, the CPU includes a general purpose processor, an NP, an embedded processor, or the like.

The CPU 102 is connected to the Ethernet port 103 by using a bus. The bus may be classified into an address bus, a data bus, a control bus, and the like. For ease of representation, only one bold line is used to represent the bus in FIG. 3, but this does not mean that there is only one bus or only one type of bus.

The power supply circuit 104 is connected to the PSE chip 101. The PSE chip 101 is connected to the Ethernet port 103. As shown in FIG. 3, the power supply circuit 104 may be connected to the PSE chip 101 and the Ethernet port 103 by using a switch circuit. In this embodiment of the present disclosure, that the switch circuit is a metal-oxide-semiconductor field-effect transistor (MOSFET) is used as an example for description.

Optionally, the power sourcing equipment 10 further includes a memory 105. The memory 105 may be integrated into the CPU 102, or may be independently disposed. The memory 105 may be a volatile memory, for example, a random-access memory (RAM). Alternatively, the memory 105 may be a non-volatile memory, for example, a flash memory, a hard disk drive (HDD), or a solid state drive (SSD).

When the CPU 102 is a general purpose processor, the memory 105 may be further configured to store a program instruction, and the memory 105 is a non-volatile memory. The CPU 102 executes the program instruction stored in the memory 105, to perform a power supply method provided in the embodiments of the present disclosure.

When the CPU 102 is an NP, the CPU 102 performs a power supply method provided in the embodiments of the present disclosure.

The intermediate device 21 includes a plurality of power supply ports, in other words, includes at least two power supply ports. In FIG. 3, for example, the intermediate device 21 includes the four power supply ports 205 to 208. As shown in FIG. 3, in the intermediate device 21, both the detection control switch 202 and the power supply control switch 203 are connected to the power extraction port 204. Both the detection control switch 202 and the power supply control switch 203 are connected to the power supply ports 205 to 208.

The detection control switch 202 includes a first switch, configured to connect the power extraction port of the intermediate device 21 with any one of the power supply ports of the intermediate device 21. The first switch is a single-pole multi-throw (single pole, multiple throw) switch and may be implemented by a MOSFET, a relay, an optical coupler, or a transistor. A quantity of throws (throw) of the single-pole multi-throw switch is set based on a quantity of power supply ports of the intermediate device. The detection control switch 202 further includes a first controller, configured to control connection or disconnection of the first switch.

The power supply control switch 203 includes a second switch, configured to connect the power extraction port 204 of the intermediate device 21 with one or more power supply ports of the intermediate device 21. The second switch is a multi-pole single-throw (multiple pole, single throw) switch and may be implemented by a MOSFET, a relay, an optical coupler, or a transistor. A quantity of poles (pole) of the multi-pole single-throw switch is set based on the quantity of power supply ports of the intermediate device. The power supply control switch 203 further includes a second controller, configured to control connection or disconnection of the second switch.

As shown in FIG. 3, the first switch is a single-pole four-throw switch. The first switch can only connect the power extraction port 204 with any one of the power supply ports 205 to 208 at any moment. For example, at a moment 1, the first switch connects the power extraction port 204 with the power supply port 205; and at a moment 2, disconnects the power extraction port 204 from the power supply port 205 and connects the power extraction port 204 with the power supply port 206.

The second switch is a four-pole single-throw switch. The second switch can connect the power extraction port 204 with one or more of the power supply ports 205 to 208 simultaneously. For example, at a moment 1, the second switch connects the power extraction port 204 with the power supply port 205, and connects the power extraction port 204 with the power supply port 206.

The first controller and the second controller may be implemented by a CPU in the intermediate device. The first controller and the second controller may alternatively be implemented by one hardware chip or two independent hardware chips. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

As shown in FIG. 3, the CPU 102, the PSE chip 101, and the power supply circuit 104 are respectively connected to the detection control switch 202 and the power supply control switch 203 of the intermediate device 21 (by using the Ethernet port 103, Ethernet cables, and the power extraction port 204).

Both the detection control switch 202 and the power supply control switch 203 of the intermediate device 21 are connected to the PD chip 311 of the powered device 31 (by using the PoE power supply port 205, Ethernet cables, and the power extraction port 312). Both the detection control switch 202 and the power supply control switch 203 of the intermediate device 21 are connected to the PD chip 321 of the powered device 32 (by using the PoE power supply port 206, Ethernet cables, and the power extraction port 322).

Further, on a basis of FIG. 3, the intermediate device 21 may also be a powered device. The intermediate device may extract power from the power sourcing equipment 10. The intermediate device 21 further includes a PD chip 201. The power sourcing equipment 10 further includes a PSE chip 106. The power supply circuit 104 is connected to the PSE chip 106. The CPU 102 is connected to the PSE chip 106 by using an IIC bus.

Figure 4:
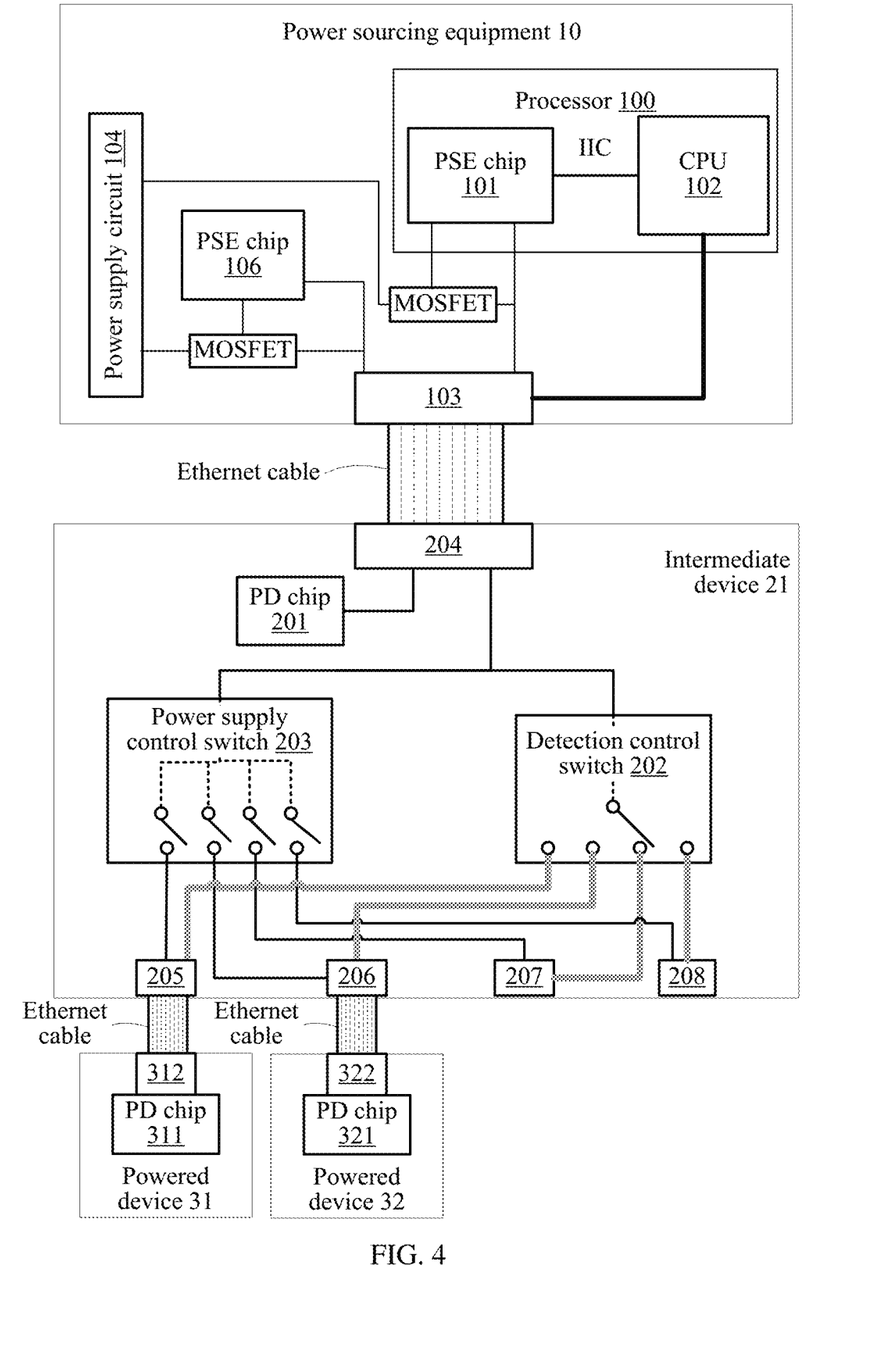
FIG. 4 is a schematic diagram of a device structure and a connection relationship in another power supply system according to an embodiment of the present disclosure.

In an implementation, as shown in FIG. 4, the PSE chip 106 is connected to the Ethernet port 103, and the PD chip 201 is connected to the power extraction port 204. The PSE chip 106 uses a cable pair that is in Ethernet cables connecting the Ethernet port 103 to the power extraction port 204 and that is different from a cable pair used by the PSE chip 101, to supply power to the PD chip 201.

The PSE chip 106 is connected to the PD chip 201 by using the Ethernet port 103, a first group of cable pairs in the Ethernet cables, and the power extraction port 204. The PSE chip 101 is connected to the detection control switch and the power supply control switch by using the Ethernet port 103, a second group of cable pairs in the Ethernet cables, and the power extraction port 204.

Figure 5:
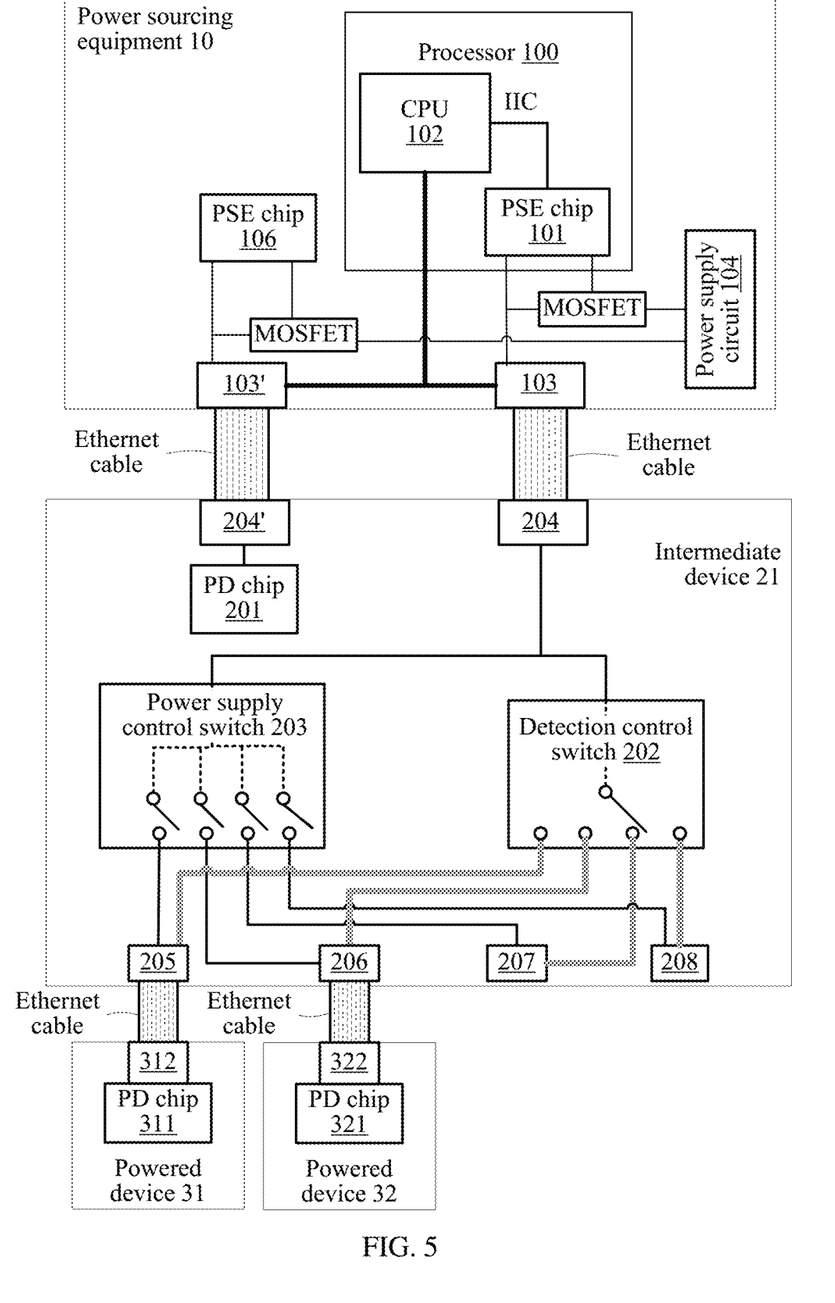
FIG. 5 is a schematic diagram of a device structure and a connection relationship in still another power supply system according to an embodiment of the present disclosure.

In another implementation, as shown in FIG. 5, the power sourcing equipment 10 further includes an Ethernet port 103'. The intermediate device 21 further includes a power extraction port 204'.

The Ethernet port 103' is connected to the power extraction port 204' by using an Ethernet cable.

The PSE chip 106 is connected to the Ethernet port 103'. The PD chip 201 is connected to the power extraction port 204'. The PSE chip 106 is connected to the PD chip 201 by using the Ethernet port 103', the Ethernet cable, and the power extraction port 204'.

In the power sourcing equipment 10 shown in FIG. 3 to FIG. 5 in this embodiment of the present disclosure, the PSE chip 101 and the PSE chip 106 may be physically two channels of a multichannel PSE chip. Alternatively, the PSE chip 101 and the PSE chip 106 may be physically two single-channel PSE chips.

According to the power sourcing equipment and the intermediate device provided in this embodiment of the present disclosure, the power sourcing equipment may detect, across the intermediate device, a plurality of powered devices connected to the intermediate device, and supply power to an effective powered device. This can avoid a power loss caused by voltage conversion, and improve power supply efficiency. In addition, the power sourcing equipment supplies power across the intermediate device to the powered device, and a PSE chip does not need to be disposed in the intermediate device. This can also reduce complexity and costs of the intermediate device.

With reference to FIG. 3 to FIG. 5, the following describes a power supply method provided in the embodiments of the present disclosure by using an example that power sourcing equipment 10 supplies power across an intermediate device 21 to each powered device connected to the intermediate device 21.

Figure 6:
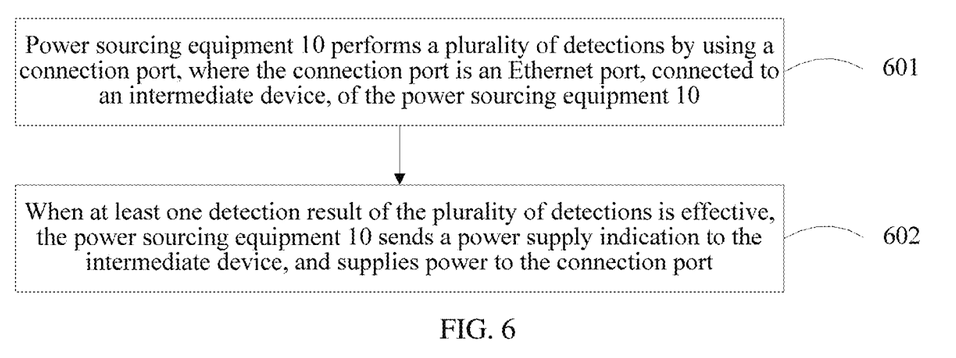
FIG. 6 is a schematic flowchart of a power supply method according to an embodiment of the present disclosure.

Referring to FIG. 6, FIG. 6 is a schematic flowchart of a power supply method according to an embodiment of the present disclosure. As shown in FIG. 6, the method includes the following steps.

601. The power sourcing equipment 10 performs a plurality of detections by using a connection port, where the connection port is an Ethernet port, connected to an intermediate device, of the power sourcing equipment 10.

A quantity of detections performed by the power sourcing equipment 10 is equal to a quantity of power supply ports of the intermediate device.

The quantity of power supply ports of the intermediate device may be preset on the power sourcing equipment 10 or be from the intermediate device. Being from the intermediate device means that the quantity of power supply ports may be sent directly by the intermediate device to the power sourcing equipment 10, or may be sent by another device, for example, a network management device, to the power sourcing equipment 10.

Optionally, when a detection result of any detection is effective, the power sourcing equipment 10 further obtains, through physical layer classification, a class (for example, class 1 or class 2) of a powered device connected to a currently connected power supply port.

As shown in FIG. 3 to FIG. 5, the connection port is the Ethernet port 103. The quantity of detections performed by the power sourcing equipment 10 is the quantity of power supply ports (the power supply ports 205 to 208) of the intermediate device 21, that is, 4. The power sourcing equipment 10 performs four detections by using the Ethernet port 103, to detect whether the power supply ports 205 to 208 of the intermediate device 21 are connected to an effective powered device.

602. When at least one detection result of the plurality of detections is effective, the power sourcing equipment 10 sends a power supply indication to the intermediate device, and supplies power to the connection port.

The power supply indication is based on each detection result of the plurality of detections.

The sending, by the power sourcing equipment, a power supply indication to the intermediate device includes: sending the power supply indication after all of the plurality of detections are completed; or after each detection is completed, sending the power supply indication when a detection result of this detection is effective.

The power supply indication may be a detection result, or may be a derivation result, for example, a classification result. If all detection results are ineffective, all the detection results may be sent; however, none of the detection results are the power supply indication. To be specific, only a detection result whose value is effective is equivalent to the power supply indication.

The power supply indication may be a data link layer protocol packet, for example, a Link Layer Discovery Protocol (LLDP) packet.

The power supply indication or the detection result may be sent after all detections are completed, and the power supply indication may include an identifier, a serial number, or a bitmap (bitmap) of a port. Alternatively, a detection result of each detection or the power supply indication may be sent after this detection is completed, and the power supply indication may include an identifier or a serial number of a port.

As shown in FIG. 3 to FIG. 5, the CPU 102 may send the detection result or the power supply indication to the power supply control switch 203 after each detection, to control the second switch. Optionally, the CPU 102 records each detection result of the plurality of detections, and sends the power supply indication or the detection result to the power supply control switch 203 after detecting all power supply ports of the intermediate device is completed.

The memory 105 is configured to store all detection results, and may further store a class of a powered device.

The intermediate device is connected to a power supply port corresponding to the power supply indication, so that the power sourcing equipment 10 supplies power to a powered device.

Optionally, before sending the power supply indication, the power sourcing equipment 10 generates the power supply indication according to a power supply policy.

The power supply policy may be as follows: When remaining power of the power sourcing equipment is greater than a preset threshold, power is supplied to a powered device with an effective detection result; when the remaining power of the power sourcing equipment is less than the preset threshold, a to-be-powered power supply port is determined from all power supply ports with effective detection results based on a priority of the power supply ports or required power.

The supplying, by the power sourcing equipment 10, power to the connection port includes: supplying, by the PSE chip 101, power to the connection port (the Ethernet port 103) by using the power supply circuit 104. The power supply circuit 104 may supply power to the PSE chip 101, and then the PSE chip supplies power to the connection port. Alternatively, as shown in FIG. 3 to FIG. 5, the PSE chip may control connection or disconnection of the switch circuit, to control the power supply circuit 104 to supply power to the connection port (the Ethernet port 103). As shown in FIG. 3 to FIG. 5, the PSE chip 101 may perform a write operation on a register, for example, write 1 or 0 for a power-on register, to output a high level or a low level to connect or disconnect the MOS transistor and control the power supply circuit 104 to supply power or stop supplying power. Optionally, the PSE chip 101 controls, according to an instruction of the CPU 102, the power supply circuit 104 to supply power.

The following describes in detail different implementations of step 601 in which the power sourcing equipment 10 performs the plurality of detections by using the connection port.

In a first possible implementation, the power sourcing equipment 10 periodically performs detections by using the connection port. A detection period of the detection performed by the power sourcing equipment is preset or from the intermediate device. Correspondingly, the intermediate device switches power supply ports based on the detection period. Specifically, the following steps 6011 to 6013 may be used for this implementation.

6011. The power sourcing equipment 10 sends a detection indication to the intermediate device.

The detection indication is used to instruct the intermediate device to successively connect the power supply ports of the intermediate device based on preset detection duration.

The preset detection duration is the detection period.

The preset detection duration is at least greater than or equal to duration required for performing a detection. The preset detection duration may be further greater than or equal to a sum of the duration required for performing a detection and duration required for performing classification.

Optionally, before step 6011, the preset detection duration is configured on the power sourcing equipment 10 and the intermediate device.

6012. After receiving the detection indication, the intermediate device successively connects a plurality of power supply ports of the intermediate device, and keeps each power supply port in a connected state for preset detection duration.

In this way, the power sourcing equipment 10 can detect one currently connected power supply port of the intermediate device in each preset detection duration.

The intermediate device may successively connect all the power supply ports based on a port detection sequence. The port detection sequence may be preset on the intermediate device.

As shown in FIG. 3 to FIG. 5, optionally, the CPU 102 sends a detection indication to the detection control switch 202, and instructs the PSE chip 101 to start a detection. The detection indication may be a data link layer packet, for example, an LLDP packet. Optionally, the PSE chip 101 sends a detection indication to the detection control switch 202, and starts a detection after sending the detection indication. The detection indication is an electrical signal.

After receiving the detection indication, the detection control switch 202 successively connects the power extraction port 204 with the power supply ports 205 to 208 based on a port detection sequence, and keeps the power extraction port 204 and each power supply port (the power supply port 205, 206, 207, or 208) in a connected state for the preset detection duration.

For example, the port detection sequence may be from 205 to 206, then to 207, and then to 208, or from 208 to 207, then to 206, and then to 205.

Alternatively, step 6011 and step 6012 may be implemented in reverse. That is, the intermediate device sends a detection indication to the power sourcing equipment 10; and after sending the detection indication, the intermediate device successively connects the power supply ports of the intermediate device, and keeps each power supply port in a connected state for preset detection duration. Specifically, the following steps 6011' and 6012' are included.

6011'. The power sourcing equipment 10 receives a detection indication sent by the intermediate device.

The detection indication is used to instruct the power sourcing equipment 10 to periodically perform detections based on the preset detection duration. The detection indication may further include the preset detection duration.

6012'. After sending the detection indication, the intermediate device successively connects a plurality of power supply ports of the intermediate device, and keeps each power supply port in a connected state for preset detection duration.

6013. The power sourcing equipment 10 periodically detects a currently connected power supply port of the intermediate device by using the preset detection duration as a period.

The quantity of detections performed by the power sourcing equipment 10 is equal to the quantity of power supply ports of the intermediate device.

After each detection is completed, the power sourcing equipment 10 may send a detection result of this detection to the intermediate device. When the detection result is effective, the detection result is equivalent to the power supply indication. Alternatively, the power sourcing equipment 10 may record a detection result of each detection, and send all detection results or the power supply indication to the intermediate device after all detections are completed.

As shown in FIG. 3 to FIG. 5, the PSE chip 101 periodically inputs a detection voltage to the Ethernet port 103 by using the preset detection duration as a period, detects impedance of a currently connected power supply port (for example, the power supply port 205) of the intermediate device, determines, based on the detected impedance, whether the currently connected power supply port is connected to an effective powered device, and obtains a detection result. Alternatively, the CPU 102 periodically sends an IIC instruction to the PSE chip 101, to instruct the PSE chip 101 to input a detection voltage to the Ethernet port 103, detects impedance of a currently connected power supply port (for example, the power supply port 205) of the intermediate device, and obtains a detection result.

The detection result may be effective or ineffective. The detection result is effective, indicating that the power supply port is currently connected to an effective powered device. The detection result is ineffective, indicating that a device currently connected to the power supply port is not an effective powered device or the power supply port is currently connected to no device.

With reference to FIG. 3 to FIG. 5, the following describes, by assuming that the preset detection duration is 100 milliseconds (ms), a process in which the power sourcing equipment 10 periodically performs detections by using the connection port. A moment at which the power sourcing equipment 10 sends the detection indication to the intermediate device is used as a start moment.

In a first detection period, the detection control switch 202 connects the power extraction port 204 with the power supply port 205, and keeps a connected state 100 ms. The PSE chip 101 inputs a detection voltage to the Ethernet port 103 (through the power extraction port 204 and the detection control switch 202), detects impedance of the power supply port 205, and obtains an effective detection result based on the detected impedance (namely, impedance of the powered device 31). The PSE chip 101 writes the obtained detection result into a detection register of the Ethernet port 103.

In a second detection period, the detection control switch 202 connects the power extraction port 204 with the power supply port 206, and keeps a connected state 100 ms. The PSE chip 101 inputs a detection voltage to the Ethernet port 103, detects impedance of the power supply port 206, and obtains an effective detection result based on the detected impedance (namely, impedance of the powered device 32). The PSE chip 101 writes the obtained detection result into the detection register of the Ethernet port 103.

In a third detection period, the detection control switch 202 connects the power extraction port 204 with the power supply port 207, and keeps a connected state 100 ms. The PSE chip 101 inputs a detection voltage to the Ethernet port 103, detects impedance of the currently connected power supply port 207, and obtains an ineffective detection result based on the detected impedance. The PSE chip 101 writes the obtained detection result into the detection register of the Ethernet port 103.

In a fourth detection period, the detection control switch 202 connects the power extraction port 204 with the power supply port 208, and keeps a connected state 100 ms. The PSE chip 101 inputs a detection voltage to the Ethernet port 103, detects impedance of the currently connected power supply port 208, and obtains an ineffective detection result based on the detected impedance. The PSE chip 101 writes the obtained detection result into the detection register of the Ethernet port 103.

In this implementation, information exchange between the power sourcing equipment and the intermediate device can be reduced, and a detection process of the power sourcing equipment is simplified.

In a second possible implementation, the power sourcing equipment 10 sends, between any two detections, a detection indication to the intermediate device, to instruct the intermediate device to switch power supply ports. To be specific, before performing each detection, the power sourcing equipment 10 sends a detection indication to the intermediate device. The detection indication is used to instruct the intermediate device to connect a next to-be-detected power supply port.

The detection indication may be an electrical signal.

Alternatively, the detection indication may include an identifier or a serial number of the next to-be-detected power supply port of the intermediate device. The detection indication may be a data link layer packet, for example, an LLDP packet.

An identifier of a power supply port may be a port number, an address, or the like of the power supply port. Optionally, the power sourcing equipment 10 (the CPU 102 in FIG. 3 to FIG. 5) obtains port numbers, addresses, or the like of the power supply ports of the intermediate device in advance.

Serial numbers of the power supply ports may be a sequence of detecting the power supply ports and controlling power supply. For example, in a system shown in FIG. 3 to FIG. 5, a serial number 1 represents the power supply port 205, a serial number 2 represents the power supply port 206, a serial number 3 represents the power supply port 207, and a serial number 4 represents the power supply port 208.

In this implementation, the power sourcing equipment 10 controls a detection pace. To be specific, each time the power sourcing equipment 10 sends one detection indication to the intermediate device, the power sourcing equipment 10 performs one detection. Specifically, the following steps 6014 to 6016 are included.

6014. The power sourcing equipment 10 sends a detection indication to the intermediate device.

As shown in FIG. 3 to FIG. 5, optionally, the CPU 102 sends a detection indication to the detection control switch 202, and instructs the PSE chip 101 to start a detection. The detection indication may be a data link layer packet.

Optionally, the PSE chip 101 sends a detection indication to the detection control switch 202, and starts a detection after sending the detection indication. The detection indication is an electrical signal.

6015. The intermediate device connects a to-be-detected power supply port of the intermediate device based on the detection indication.

When the intermediate device receives the detection indication for the first time, the intermediate device is switched from connecting no power supply port to connecting a to-be-detected power supply port. When the intermediate device has received the detection indication before, the intermediate device is switched from connecting a currently detected power supply port to connecting a to-be-detected power supply port. To be specific, before each detection, the power sourcing equipment 10 sends a detection indication to the intermediate device, to connect a next to-be-detected power supply port of the intermediate device.

6016. The power sourcing equipment 10 detects a currently connected to-be-detected power supply port.

As shown in FIG. 3 to FIG. 5, optionally, the PSE chip 101 sends a detection indication to the detection control switch 202, and performs a detection after sending the detection indication. The detection indication may be an electrical signal.

Optionally, the CPU 102 sends a detection indication to the detection control switch 202, and instructs the PSE chip 101 to start a detection. Specifically, the CPU 102 writes the detection indication into a register of the PSE chip 101 by using an IIC bus, and instructs the PSE chip 101 to detect the Ethernet port 103. The detection indication may include an identifier or a serial number of a next to-be-detected power supply port of the intermediate device.

When the detection indication does not include an identifier or a serial number of a next to-be-detected power supply port, the intermediate device connects a next to-be-detected power supply port based on a preset detection sequence after receiving each detection indication.

The power sourcing equipment 10 performs steps 6014 to 6016 a plurality of times based on the quantity of power supply ports of the intermediate device, to complete detections of all the power supply ports of the intermediate device.

In this implementation, a delay caused because a constant detection period is used for each power supply port can be avoided, and detection efficiency is improved.

The following describes, with reference to FIG. 3 to FIG. 5 by using an example, a process in which the power sourcing equipment 10 sends, between any two detections, the detection indication to the intermediate device to complete the plurality of detections.

S1. The PSE chip 101 sends a detection indication to the detection control switch 202; and after receiving the detection indication, the detection control switch 202 connects the power extraction port 204 with the power supply port 205. The PSE chip 101 inputs a detection voltage to the Ethernet port 103, detects impedance of the power supply port 205, and obtains an effective detection result based on the detected impedance (that is, impedance of the powered device 31).

S2. The PSE chip 101 sends a detection indication to the detection control switch 202; and after receiving the detection indication, the detection control switch 202 connects the power extraction port 204 with the power supply port 206. The PSE chip 101 inputs a detection voltage to the Ethernet port 103, detects impedance of the power supply port 206, and obtains an effective detection result based on the detected impedance (that is, impedance of the powered device 32).

S3. The PSE chip 101 sends a detection indication to the detection control switch 202; and after receiving the detection indication, the detection control switch 202 connects the power extraction port 204 with the power supply port 207. The PSE chip 101 inputs a detection voltage to the Ethernet port 103, detects impedance of the power supply port 207, and obtains an ineffective detection result based on the detected impedance.

S4. The PSE chip 101 sends a detection indication to the detection control switch 202; and after receiving the detection indication, the detection control switch 202 connects the power extraction port 204 with the power supply port 208. The PSE chip 101 inputs a detection voltage to the Ethernet port 103, detects impedance of the power supply port 208, and obtains an ineffective detection result based on the detected impedance.

In this way, the PSE chip 101 sends a detection indication before each detection, to instruct the intermediate device to switch the connected power supply port, so that the power supply ports 205 to 208 of the intermediate device can be detected successively.

In a third possible implementation, between any two detections, the power sourcing equipment 10 receives a detection indication sent by the intermediate device, and performs a next detection after receiving the detection indication.

The detection indication may be an electrical signal. The detection indication may alternatively be an identifier or a serial number of a next to-be-detected power supply port of the intermediate device.

In this implementation, the intermediate device controls a detection pace. To be specific, each time the power sourcing equipment 10 receives one detection indication sent by the intermediate device, the power sourcing equipment 10 performs one detection. This implementation specifically includes the following steps 6017 and 6018.

6017. The power sourcing equipment 10 receives a detection indication sent by the intermediate device.

After connecting a next to-be-detected power supply port, the intermediate device sends the detection indication to the power sourcing equipment 10. The detection indication is used to indicate that the intermediate device has switched to connecting the next to-be-detected power supply port.

As shown in FIG. 3 to FIG. 5, optionally, the detection control switch 202 sends a detection indication to the CPU 102, so that the CPU 102 instructs the PSE chip 101 to start a detection. The detection indication may be a data link layer packet. Specifically, the CPU 102 writes the detection indication into a register of the PSE chip 101 by using an IIC bus, and instructs the PSE chip 101 to detect the Ethernet port 103.

Optionally, the detection control switch 202 sends a detection indication to the PSE chip 101, where the detection indication is an electrical signal, and the PSE chip 101 starts a detection based on the detection indication.

A quantity of times of sending the detection indication by the intermediate device is equal to the quantity of power supply ports of the intermediate device.

6018. The power sourcing equipment 10 detects a currently connected to-be-detected power supply port of the intermediate device based on the detection indication.

After receiving the detection indication of the intermediate device, the power sourcing equipment 10 inputs a detection voltage to the connection port, detects impedance of the currently connected to-be-detected power supply port of the intermediate device, and obtains a detection result based on the detected impedance.

The intermediate device may switch the connected power supply port at a preset time interval (for example, the preset detection duration), and send a next detection indication. Alternatively, after receiving the detection result returned by the power sourcing equipment 10, the intermediate device may switch the connected power supply port, and send a next detection indication.

The power sourcing equipment 10 performs steps 6017 and 6018 a plurality of times, to complete detections of all the power supply ports of the intermediate device.

In this implementation, a detection process of the power sourcing equipment can be simplified, so that complexity of the power sourcing equipment is reduced.

The following describes, with reference to FIG. 3 to FIG. 5 by using an example, a process in which the power sourcing equipment 10 receives, between any two detections, the detection indication sent by the intermediate device to complete the plurality of detections.

T1. The detection control switch 202 connects the power extraction port 204 with the power supply port 205, and sends a detection indication to the PSE chip 101. After receiving the detection indication, the PSE chip 101 inputs a detection voltage to the Ethernet port 103, detects impedance of the power supply port 205, and obtains an effective detection result based on the detected impedance (that is, impedance of the powered device 31). The PSE chip 101 sends the detection result to the intermediate device (the power supply control switch 203).

T2. After the power supply control switch 203 receives the detection result, the detection control switch 202 is switched to connecting the power extraction port 204 with the power supply port 206, and sends a detection indication to the PSE chip 101. After receiving the detection indication, the PSE chip 101 inputs a detection voltage to the Ethernet port 103, detects impedance of the power supply port 206, and obtains an effective detection result based on the detected impedance (that is, impedance of the powered device 32).

T3. After the power supply control switch 203 receives the detection result, the detection control switch 202 is switched to connecting the power extraction port 204 with the power supply port 207, and sends a detection indication to the PSE chip 101. After receiving the detection indication, the PSE chip 101 inputs a detection voltage to the Ethernet port 103, detects impedance of the power supply port 207, and obtains an ineffective detection result based on the detected impedance.

T4. After the power supply control switch 203 receives the detection result, the detection control switch 202 is switched to connecting the power extraction port 204 with the power supply port 208, and sends a detection indication to the PSE chip 101. After receiving the detection indication, the PSE chip 101 inputs a detection voltage to the Ethernet port 103, detects impedance of the power supply port 208, and obtains an ineffective detection result based on the detected impedance.

In this way, each time the PSE chip 101 receives a one-time detection indication, the PSE chip 101 performs one detection, to successively detect the power supply ports 205 to 208 of the intermediate device.

Optionally, the intermediate device may be a powered device, and the method further includes the following steps.

603. The power sourcing equipment 10 detects whether the intermediate device is an effective powered device.

As shown in FIG. 4, the PSE chip 106 inputs a detection voltage to a second group of cable pairs of the Ethernet port 103. As shown in FIG. 5, the PSE chip 106 inputs a detection voltage to the Ethernet port 103', detects impedance of the intermediate device 21 (the PD chip 202), and determines, based on the detected impedance, whether the intermediate device 21 is the effective powered device.

604. When the power sourcing equipment 10 determines that the intermediate device is the effective powered device, the power sourcing equipment 10 supplies power to the intermediate device.

As shown in FIG. 4 or FIG. 5, the PSE chip 106 controls the power supply circuit 104 to supply power to the intermediate device. Specifically, as shown in FIG. 4 or FIG. 5, the PSE chip 106 may perform a write operation on a register, for example, write 1 or 0 for a power-on register, to output a high level or a low level to connect or disconnect the MOSFET and control the power supply circuit 104 to supply power or stop supplying power to a first group of cable pairs of the Ethernet port 103 or to the Ethernet port 103'.

Optionally, after determining that the intermediate device is the effective powered device, and before supplying power to the intermediate device, the power sourcing equipment 10 obtains a class (for example, class 2 or class 3) of the intermediate device by using physical layer classification. As shown in FIG. 4, the PSE chip 106 inputs a classification voltage to the Ethernet port 103 (the second group of cable pairs), detects a classification current, and obtains the class of the intermediate device 21 (the PD chip 202). As shown in FIG. 5, the PSE chip 106 inputs a classification voltage to the Ethernet port 103', detects a classification current, and obtains the class of the intermediate device 21 (the PD chip 202).

Optionally, after supplying power to the intermediate device, the power sourcing equipment 10 communicates with the intermediate device by using link layer classification, for example, by using the LLDP, to obtain the class of the intermediate device 21.

According to the power supply method provided in this embodiment of the present disclosure, the power sourcing equipment performs the plurality of detections on the connection port connected to the intermediate device, to detect a plurality of powered devices connected to the intermediate device, and supplies power to an effective powered device. This can avoid a power loss caused by voltage conversion, and improve power supply efficiency. In addition, the power sourcing equipment supplies power across the intermediate device to the powered device, and a PSE chip does not need to be disposed in the intermediate device. This can also reduce costs and complexity of the intermediate device.

Figure 7:
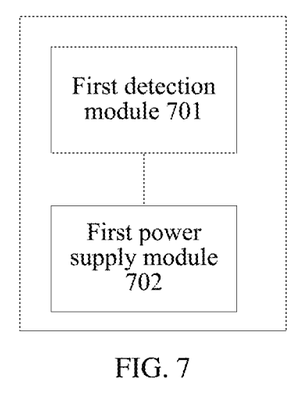
FIG. 7 is a schematic structural diagram of power sourcing equipment according to an embodiment of the present disclosure.

As shown in FIG. 7, FIG. 7 shows power sourcing equipment 10 according to an embodiment of the present disclosure. The power sourcing equipment 10 is configured to implement the power supply method shown in FIG. 6. The power sourcing equipment 10 includes a first detection module 701 and a first power supply module 702.

The first detection module 701 is configured to perform a plurality of detections on a connection port. The connection port is an Ethernet port, connected to an intermediate device, of the power sourcing equipment 10. A quantity of detections performed by the power sourcing equipment 10 is equal to a quantity of power supply ports of the intermediate device.

The first power supply module 702 is configured to: when at least one detection result of the plurality of detections performed by the first detection module 701 is effective, send a power supply indication to the intermediate device, and supply power to the connection port.

For implementation details of the first detection module 701 and the first power supply module 702, refer to the power supply method shown in FIG. 6.

Optionally, the power sourcing equipment 10 further includes a physical layer classification module, configured to: when a detection result of the first detection module 701 is effective, after the first detection module 701, obtain, by using physical layer classification, a class of a powered device whose detection result is effective.

Optionally, the power sourcing equipment 10 further includes a power supply control module, configured to: generate the power supply indication according to a power supply policy, to perform power supply control on the powered device according to the power supply policy.

Figure 8:
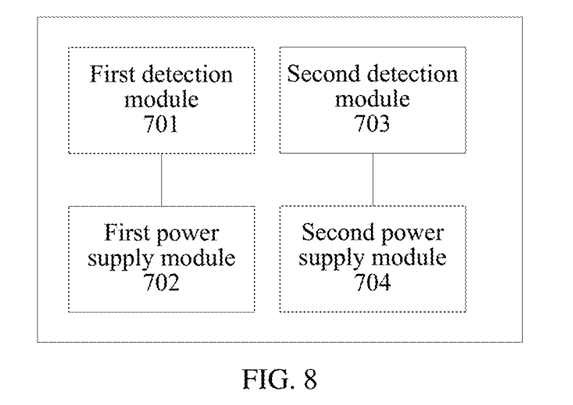
FIG. 8 is a schematic structural diagram of another power sourcing equipment according to an embodiment of the present disclosure.

Optionally, as shown in FIG. 8, the power sourcing equipment 10 further includes a second detection module 703 and a second power supply module 704.

The second detection module 703 is configured to detect whether the intermediate device is an effective powered device.

The second power supply module 704 is configured to: when the second detection module 703 determines that the intermediate device is the effective powered device, supply power to the intermediate device.

For implementation details of the second detection module 703 and the second detection module 703, refer to the power supply method shown in FIG. 6.

Optionally, the power sourcing equipment 10 further includes a link layer classification module, configured to obtain a class of the intermediate device after power is supplied to the intermediate device.

The power sourcing equipment according to this embodiment of the present disclosure performs the plurality of detections on the connection port connected to intermediate device, to detect a plurality of powered devices connected to the intermediate device, and supplies power across the intermediate device to a powered device. This can avoid a power loss caused by voltage conversion, and improve power supply efficiency. In addition, this can also reduce power supply management complexity and device costs.

A person of ordinary skill in the art may understand that all or a part of the steps of the method embodiments may be implemented by a program instructing relevant hardware. The program may be stored in a computer readable storage medium. The storage medium may include: a random access memory, a read-only memory, a flash memory, a hard disk, a solid state disk, or an optical disc.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. Power sourcing equipment comprising:
   a power supply circuit;
   a connection port configured to connect to an intermediate device comprising a first quantity of power supply ports; and
   a processor coupled to the connection port and configured to:
     perform a second quantity of detections using the connection port and in cooperation with a detection control switch in the intermediate device, wherein the first quantity and the second quantity are equal, and wherein the detections are associated with detection results; and
     send a power supply indication to the intermediate device and supply power to the connection port using the power supply circuit when at least one of the detection results is effective, indicating that at least one of the power supply ports is currently connected to an effective powered device,
     wherein the power supply indication is based on the detection results.

2. The power sourcing equipment of claim 1, wherein the detections comprise a first detection, wherein the detection results comprise a first detection result, wherein the first detection is associated with the first detection result, and wherein the processor is further configured to send the first detection result to the intermediate device after completion of the first detection.

3. The power sourcing equipment of claim 1, wherein the processor is further configured to:
   record the detection results; and
   send the power supply indication to the intermediate device after completion of the detections.

4. The power sourcing equipment of claim 1, wherein the processor is further configured to:
   receive a detection indication from the intermediate device; and
   periodically detect a currently-connected power supply port based on the detection indication.

5. The power sourcing equipment of claim 1, wherein the processor is further configured to:
   send a detection indication to the intermediate device, wherein the detection indication instructs the intermediate device to successively connect a plurality of the power supply ports based on a preset detection duration; and periodically detect a currently-connected power supply port for the preset detection duration.

6. The power sourcing equipment of claim 1, wherein the processor is further configured to send, before performing each of the detections, a detection indication to the intermediate device, wherein the detection indication instructs the intermediate device to connect a next to-be-detected power supply port.

7. The power sourcing equipment of claim 1, wherein the processor is further configured to:
receive a detection indication from the intermediate device; and
perform a next detection based on the detection indication and using the connection port.

8. A network device comprising:
a power extraction port configured to connect to power sourcing equipment;
a plurality of power supply ports;
a detection control switch connected to the power extraction port and the power supply ports and configured to connect the power extraction port with any one of the power supply ports at any moment to enable the power sourcing equipment to perform detection of the power supply port that is connected by the detection control switch; and
a power supply control switch configured to connect the power extraction port with an effective port in the power supply ports after the detection,
wherein the effective port has an effective detection result indicating that the effective port is currently connected to an effective powered device.

9. The network device of claim 8, wherein the power supply control switch is further configured to:
receive a power supply indication from the power sourcing equipment; and
connect the effective port based on the power supply indication.

10. The network device of claim 8, wherein the detection control switch is further configured to:
receive a detection indication from the power sourcing equipment;
successively connect the power supply ports based on the detection indication; and
keep each power supply port in a connected state for a preset detection duration.

11. The network device of claim 8, wherein the detection control switch is further configured to:
send a detection indication to the power sourcing equipment, wherein the detection indication instructs the power sourcing equipment to periodically detect, based on a preset detection duration, the power supply port connected by the detection control switch;
successively connect the power supply ports; and
keep each power supply port in a connected state for the preset detection duration.

12. The network device of claim 8, wherein the detection control switch is further configured to:
receive a detection indication from the power sourcing equipment; and
connect a next to-be-detected power supply port in the power supply ports based on the detection indication.

13. The network device of claim 8, wherein the detection control switch is further configured to:

connect a next to-be-detected power supply port in the power supply ports; and
send a detection indication to the power sourcing equipment,
wherein the detection indication instructs the power sourcing equipment to perform one detection.

14. A power supply method implemented by power sourcing equipment, the power supply method comprising:
connecting, using a connection port of the power sourcing equipment, to an intermediate device comprising a first quantity of power supply ports;
performing a second quantity of detections using the connection port and in cooperation with a detection control switch in the intermediate device, wherein the first quantity and the second quantity are equal, and wherein the detections are associated with detection results; and
sending a power supply indication to the intermediate device and supplying power to the connection port,
wherein sending the power supply indication to the intermediate device and supplying the power to the connection port are in response to at least one of the detection results being effective, indicating that at least one of the power supply ports is currently connected to an effective powered device, and
wherein the power supply indication is based on the detection results.

15. The method of claim 14, wherein sending the power supply indication to the intermediate device comprises:
sending the power supply indication to the intermediate device after completion of the detections; or
sending to the intermediate device a first detection result associated with a first detection after completion of the first detection.

16. The method of claim 14, wherein performing the second quantity of detections using the connection port comprises:
sending a detection indication to the intermediate device before performing the detections; or
performing one detection in response to receiving each detection indication from the intermediate device.

17. The method of claim 14, wherein performing the second quantity of detections using the connection port comprises:
receiving a detection indication from the intermediate device; and
periodically detecting a currently-connected power supply port of the intermediate device based on the detection indication.

18. The method of claim 14, wherein performing the second quantity of detections using the connection port comprises:
sending a detection indication to the intermediate device, wherein the detection indication instructs the intermediate device to successively connect a plurality of the power supply ports based on a preset detection duration; and
periodically detecting a currently-connected power supply port for the preset detection duration.

19. A power supply system comprising:
power sourcing equipment;
a plurality of powered devices; and
a network device coupled to the power sourcing equipment and the powered devices and comprising:
a power extraction port connected to the power sourcing equipment;

a plurality of power supply ports connected to the powered devices;

a detection control switch coupled to the power extraction port and the power supply ports and configured to connect the power extraction port with any one of the power supply ports to enable the power sourcing equipment to perform detection of the power supply port that is connected by the detection control switch; and a power supply control switch coupled to the power extraction port and the power supply ports and configured to connect the power extraction port with an effective port in the power supply ports after the detection to enable the power sourcing equipment to supply power to the powered device connected to the effective port, wherein the effective port has an effective detection result.

20. The power supply system of claim 19, wherein the power supply control switch is further configured to:

receive a power supply indication from the power sourcing equipment; and connect the effective port based on the power supply indication.

* * * * *